United States Patent
Mei et al.

(10) Patent No.: US 6,856,487 B1
(45) Date of Patent: Feb. 15, 2005

(54) SUSPENSION WITH MINIMIZED SECOND TORSION GAIN

(75) Inventors: Shijin Mei, Temecula, CA (US); Robert Summers, Temecula, CA (US); Warren Coon, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 312 days.

(21) Appl. No.: 10/195,661

(22) Filed: Jul. 15, 2002

Related U.S. Application Data

(60) Provisional application No. 60/387,974, filed on Jun. 10, 2002.

(51) Int. Cl.[7] ............................. G11B 5/48; G11B 21/16
(52) U.S. Cl. .................. 360/244.8; 360/245; 360/245.1
(58) Field of Search ........................ 360/244.8, 244.9, 360/245, 245.1

(56) References Cited

U.S. PATENT DOCUMENTS

| | | | | | |
|---|---|---|---|---|---|
| 5,657,187 A | * | 8/1997 | Hatch et al. | ............. | 360/244.8 |
| 5,661,619 A | * | 8/1997 | Goss | ........................ | 360/245.1 |
| 5,666,241 A | * | 9/1997 | Summers | ................. | 360/245.1 |
| 5,852,532 A | * | 12/1998 | Summers | ................. | 360/245.1 |
| 5,923,500 A | * | 7/1999 | Hagen | ..................... | 360/245.3 |
| 2002/0034039 A1 | * | 3/2002 | Hagen | ..................... | 360/97.01 |

FOREIGN PATENT DOCUMENTS

| | | | | | |
|---|---|---|---|---|---|
| JP | 07211034 A | * | 8/1995 | ........... | G11B/21/21 |
| JP | 09306113 A | * | 11/1997 | ........... | G11B/21/02 |
| JP | 11007740 A | * | 1/1999 | ........... | G11B/21/21 |

* cited by examiner

Primary Examiner—William J. Klimowicz
(74) Attorney, Agent, or Firm—Louis J. Bachand

(57) ABSTRACT

A disk drive suspension having a minimized $2^{nd}$ torsion characteristic includes a load beam having a given side profile and centerline rotation axis. The load beam has a base portion, a spring portion, and a beam portion. The beam portion has a distal section supporting a flexure having a tongue. There is a dimple between the tongue and the load beam, and a slider carried on the tongue for gimballing movement about the dimple. The dimple has a given height that displaces said beam portion so that the beam portion side profile is biased from said centerline rotation axis. A bend is placed in the beam portion distal section of a size and location to offset the displacement of the beam portion by the dimple while maintaining the beam portion before said distal section straight. Thus, the beam portion side profile registers with the centerline rotation axis and its $2^{nd}$ torsion characteristic is minimized.

2 Claims, 5 Drawing Sheets

US 6,856,487 B1

SUSPENSION WITH MINIMIZED SECOND TORSION GAIN

RELATED APPLICATION

This application claims the benefit of U.S. Provisional Application Ser. No. 60/387,974, filed Jun. 10, 2002.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and, more particularly, to suspension load beam designs that minimize second torsion gains through the aligning of the load beam side profile with the rotation centerline of the suspension.

2. Description of the Related Art

The dimple used to provide a gimballing action of the slider carried by a flexure tongue has a given height and tends with that height to bias the beam portion of the load beam out of coincidence of the load beam side profile and centerline rotation axis. This bias prevents the minimization of the $2^{nd}$ torsion characteristic.

BRIEF SUMMARY OF THE INVENTION

It is an object therefore of the invention to provide a suspension having a minimized $2^{nd}$ torsion characteristic. It is an object to provide such a suspension in which the dimple height is retained. It is a further object to adjust the suspension load beam locally to overcome the deflection and bias that the dimple height introduces into the beam portion while retaining the major portion of the beam portion straight. Another object is to reshape the distal section of the beam portion immediately adjacent the slider to accommodate the dimple height without losing straightness in the major length of the beam portion, and to maintain nearly coincident the beam portion side profile and the centerline axis of rotation, thus to minimize the $2^{nd}$ torsion characteristic.

These and other objects of the invention are realized in a disk drive suspension having a minimized $2^{nd}$ torsion characteristic, the suspension comprising a load beam having a given side profile and centerline rotation axis and comprising a base portion, a spring portion, and a beam portion, the beam portion having a distal section supporting a flexure having a tongue, a dimple between the tongue and the load beam, and a slider carried on the tongue for gimballing movement about the dimple, the dimple having a given height that displaces the beam portion so that the beam portion side profile is biased from the centerline rotation axis, the beam portion distal section having a bend of a size and location to offset the displacement of the beam portion by the dimple while maintaining the beam portion straight before the distal section, whereby the beam portion side profile registers with the centerline rotation axis and its $2^{nd}$ torsion characteristic is minimized.

In its method aspects, the invention provides a method for minimizing $2^{nd}$ torsion characteristic in a disk drive suspension, the suspension comprising a load beam having a given side profile and centerline rotation axis and comprising a base portion, a spring portion, and a beam portion, including providing said beam portion with a distal section, supporting a flexure having a tongue on the distal section, providing a dimple between the tongue and the load beam, providing a slider carried on the tongue for gimballing movement about the dimple, giving the dimple a height that displaces the beam portion so that the beam portion side profile is biased from the centerline rotation axis, and providing in the beam portion distal section a bend of a size and location to offset the displacement of the beam portion by the dimple while maintaining the beam portion straight before the distal section to register the beam portion side profile with its centerline rotation axis and thereby minimize its $2^{nd}$ torsion characteristic.

BRIEF DESCRIPTION OF THE SEVERAL VIEWS OF THE DRAWINGS

The invention will be further described in conjunction with the attached drawings in which.

DETAILED DESCRIPTION OF THE INVENTION

It is desirable in disk drive suspension design to minimize the gain for $1^{st}$ and $2^{nd}$ torsion with the constraint that resonance frequency cannot be infinitely high. Thus, the practical objective assumes a reasonably acceptable resonance frequency and seeks as low a $1^{st}$ and $2^{nd}$ torsion gain as is possible given the resonance frequency. $2^{nd}$ torsion gain is high in some suspensions because the center of gravity of the suspension is not coincident with the rotation centerline of suspension, but is offset therefrom. This causes an unbalanced mass in the suspension. An unbalanced mass drives the suspension to produce off track motion in the head (slider).

The elimination of the offset between the suspension side profile and the suspension rotation (pivot) axes will provide a desirably low gain for both the 1 stand $2^{nd}$ torsion. If the rotation axis passes through the center of mass of the suspension, there will be no off-track motion for the torsion mode frequency. In addition it is desirable to minimize the moment of inertia about the suspension longitudinal axis, the axis between the dimple and the spring portion beginning location considered as the mount plate edge.

There are technical problems in optimizing the side profile, including:
1) The suspension must be in preloaded position, and the preloaded condition makes it difficult to define the spring area shape;
2) The protrusion height of the dimple protrusion shifts the rotation axis from coincidence with the suspension side profile. Usually, the dimple protrusion is about 0.002" to 0.004".

Attempting to form the suspension, especially the load beam, with regard only to the suspension rotation axis, likely results in a non-coincidence between the rotation axis and the side profile axis, introducing a bias between the profile and rotation axes and result in off track motion for the torsional mode frequencies.

In the present invention, in addition to forming in the suspension spring area, further forming operations are employed in the beam portion with a view to optimizing the suspension side profile axis relative to the suspension rotation axis profile to minimize bias between the suspension profile and the suspension rotation center.

Figure 1:
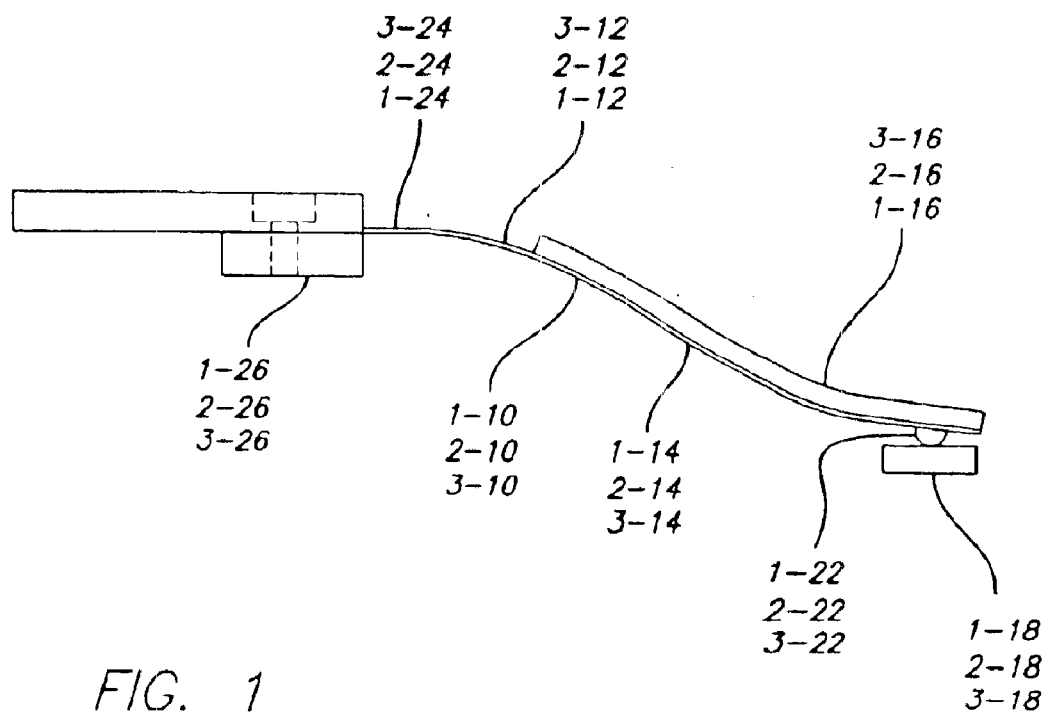
FIG. 1 is a side elevation view of the invention suspension.
Figure 2:
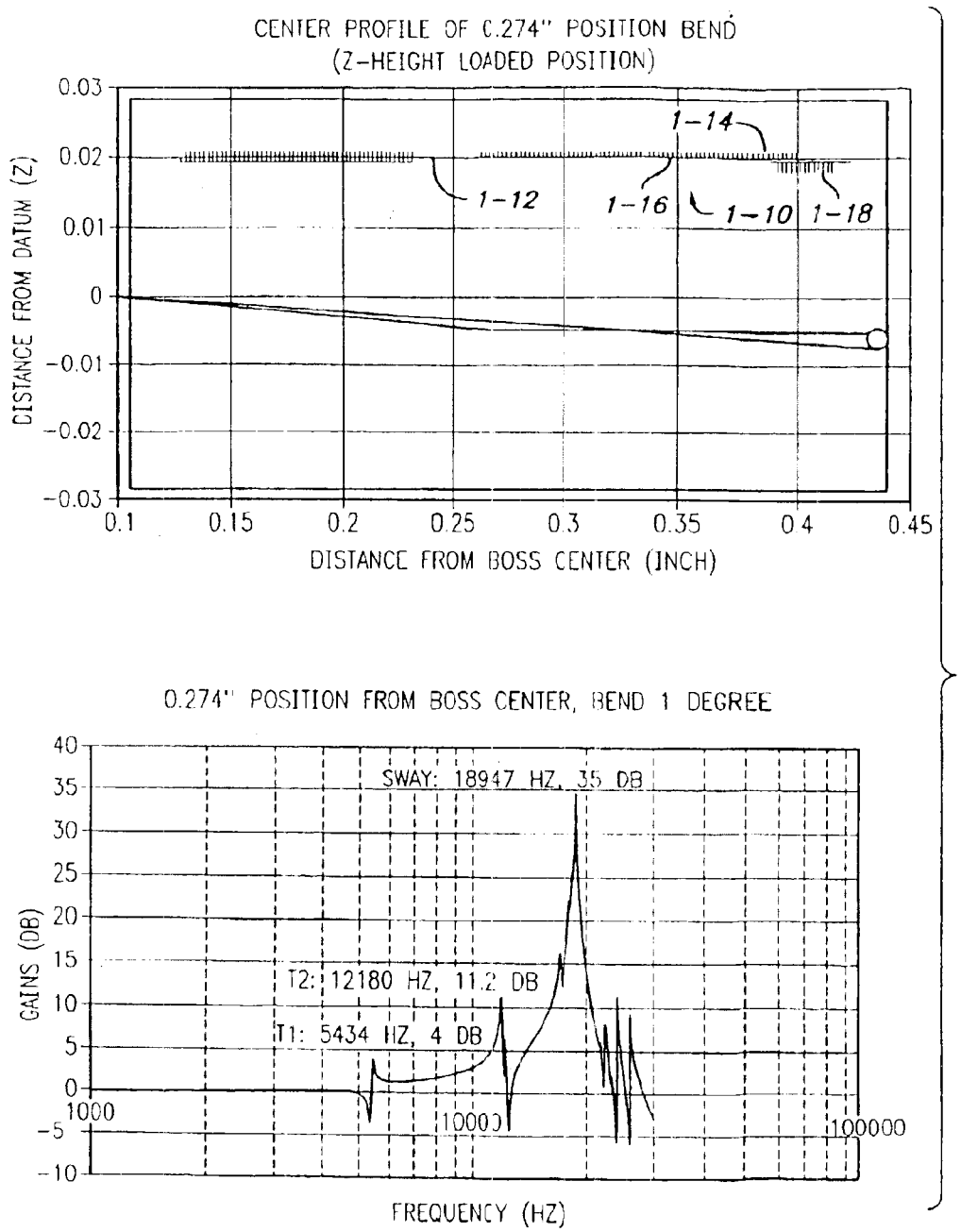
FIG. 2 is a graphical depiction of a first suspension load beam and a plot of associated $1^{st}$ and $2^{nd}$ torsion and sway values associated therewith having a beam distal section bend at a first adjacency to the slider.
Figure 3:
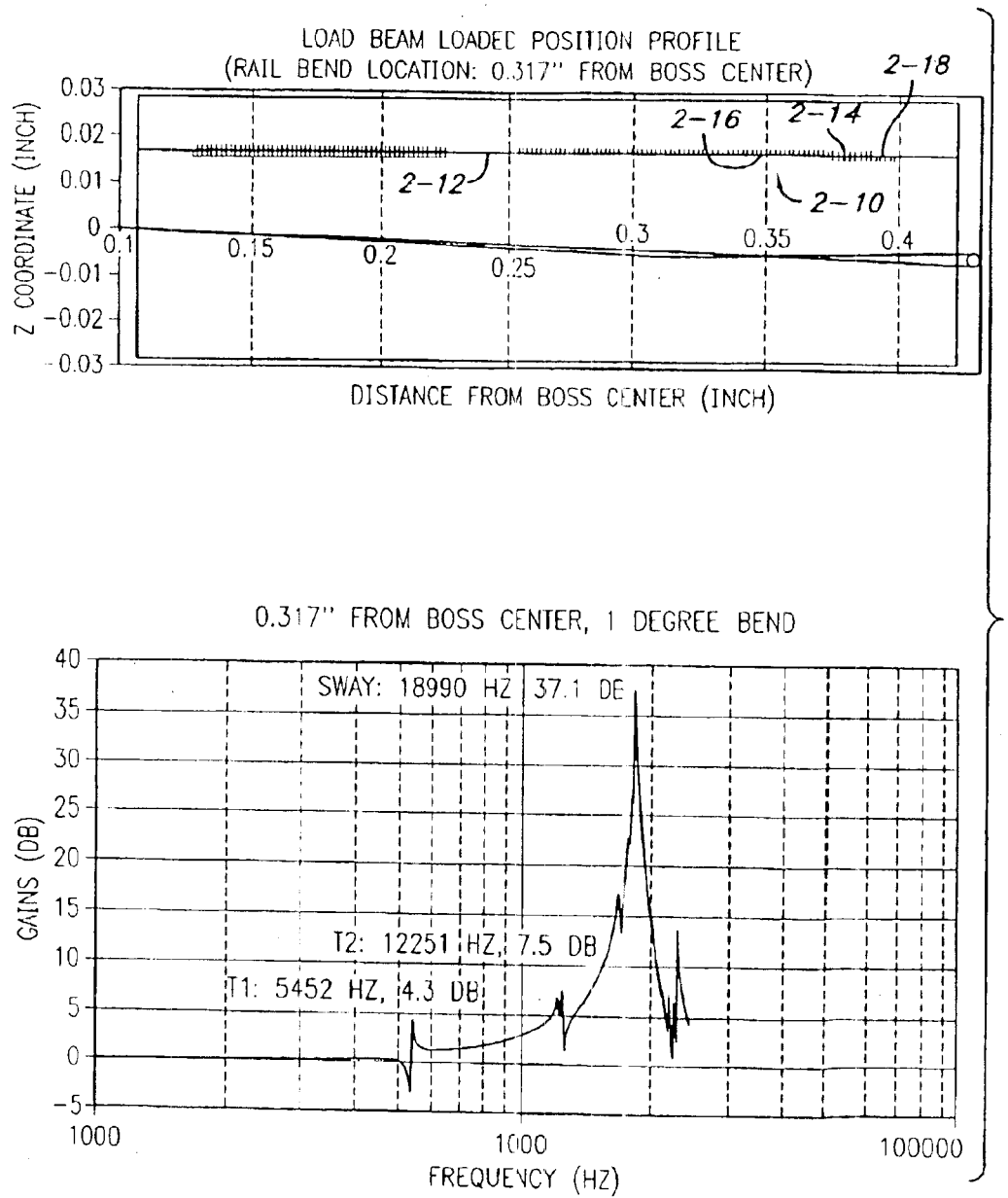
FIG. 3 is a graphical depiction of a second suspension load beam and a plot of associated $1^{st}$ and $2^{nd}$ torsion and sway values associated therewith having a beam distal section bend at a second, closer adjacent to the slider.
Figure 4:
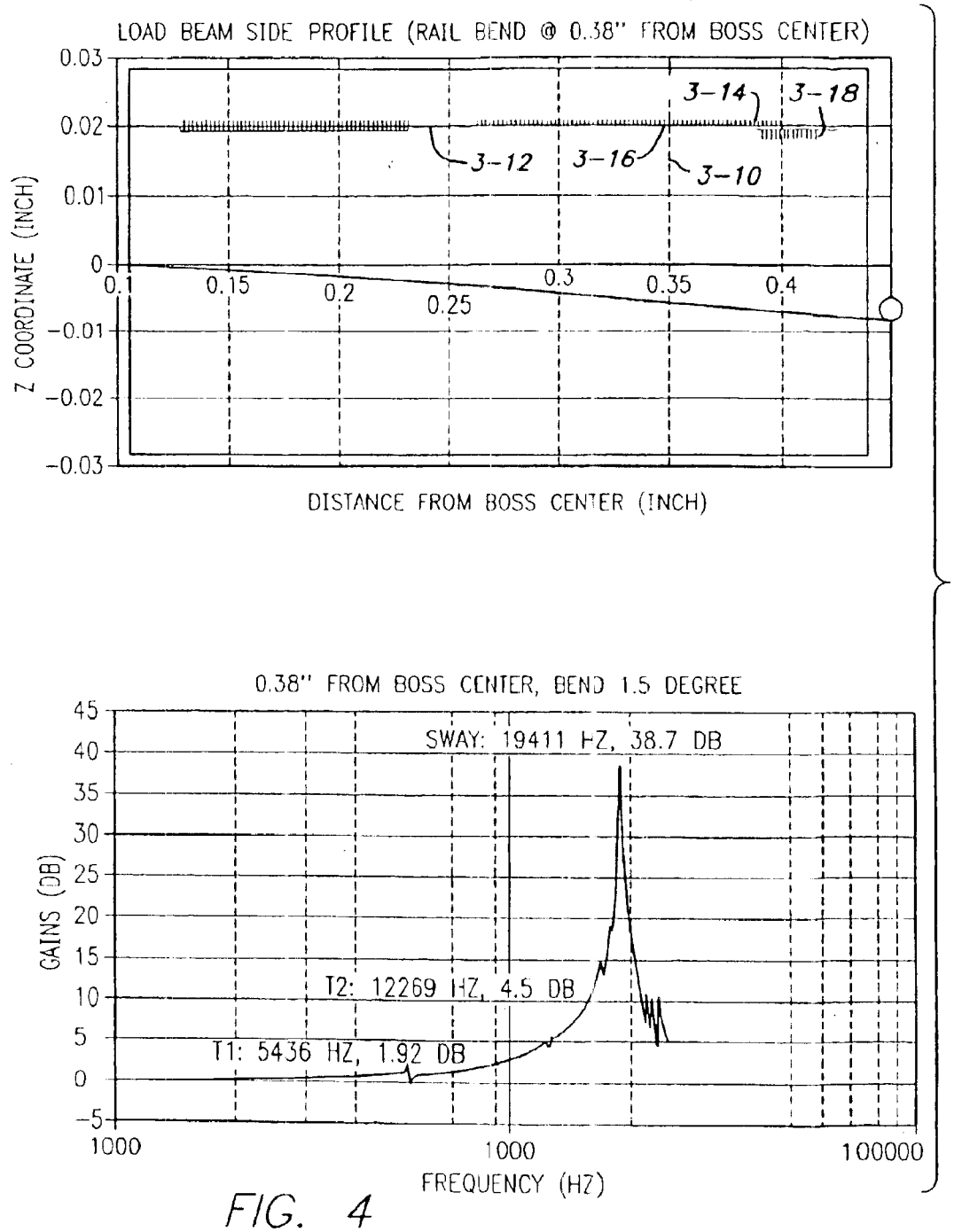
FIG. 4 is a graphical depiction of a suspension load beam and a plot of associated $1^{st}$ and $2^{nd}$ torsion and sway values associated therewith at a third, still closer adjacency to the slider, the suspension side profile and centerline rotation axis being nearly coincident and the $2^{nd}$ torsion characteristic being minimized.

A suspension according to the invention is shown in FIG. 1 with each part of the suspension labeled 10, 12 etc plus a designator 1-, 2- and 3- with reference to the illustrative three instances of the invention shown, respectively, in FIG. 2, 3, and 4, with the results of $2^{nd}$ torsion mode amplitude. Lower amplitude is better. In case the spring profile is assumed to follow the profile shown in FIG. 5. The beam forming position is varied, relatively from the center of the mount plate boss (and thus closer to the slider), from 0.274 inch to 0.317 inch to 0.38 inch in FIGS. 2, 3, and 4. The FIG. 4 position proved to be best in lowering the gain and bias, as shown in Table 1.

In each case, the suspension 1-10, 2-10 and 3-10 is bent at two different locations, first in the spring area 1-12, 2-12 and 3-12 as is generally known, and secondly at 1-16, 2-16 and 3-16 in the load beam rigid body or beam area 1-14, 2-14 and 3-14. The load beam 1-14, 2-14 and 3-14 can be with rail or without a stiffening edge rail. If there is no edge rail, the consequent sag bend close to the slider will be useful in achieving the purposes of the invention.

In accordance with the invention, the beam 1-14, 2-14 and 3-14 bend 1-16, 2-16 and 3-16 must be close to the slider 1-18, 2-18 and 3-18 to achieve in concert with the spring bend the desired minimizing of $2^{nd}$ torsion gain. $1^{st}$ torsion mode amplitude is controlled by spring area, but the $2^{nd}$ torsion mode amplitude is controlled by load beam placement relative to torsional axis.

Figure 5:
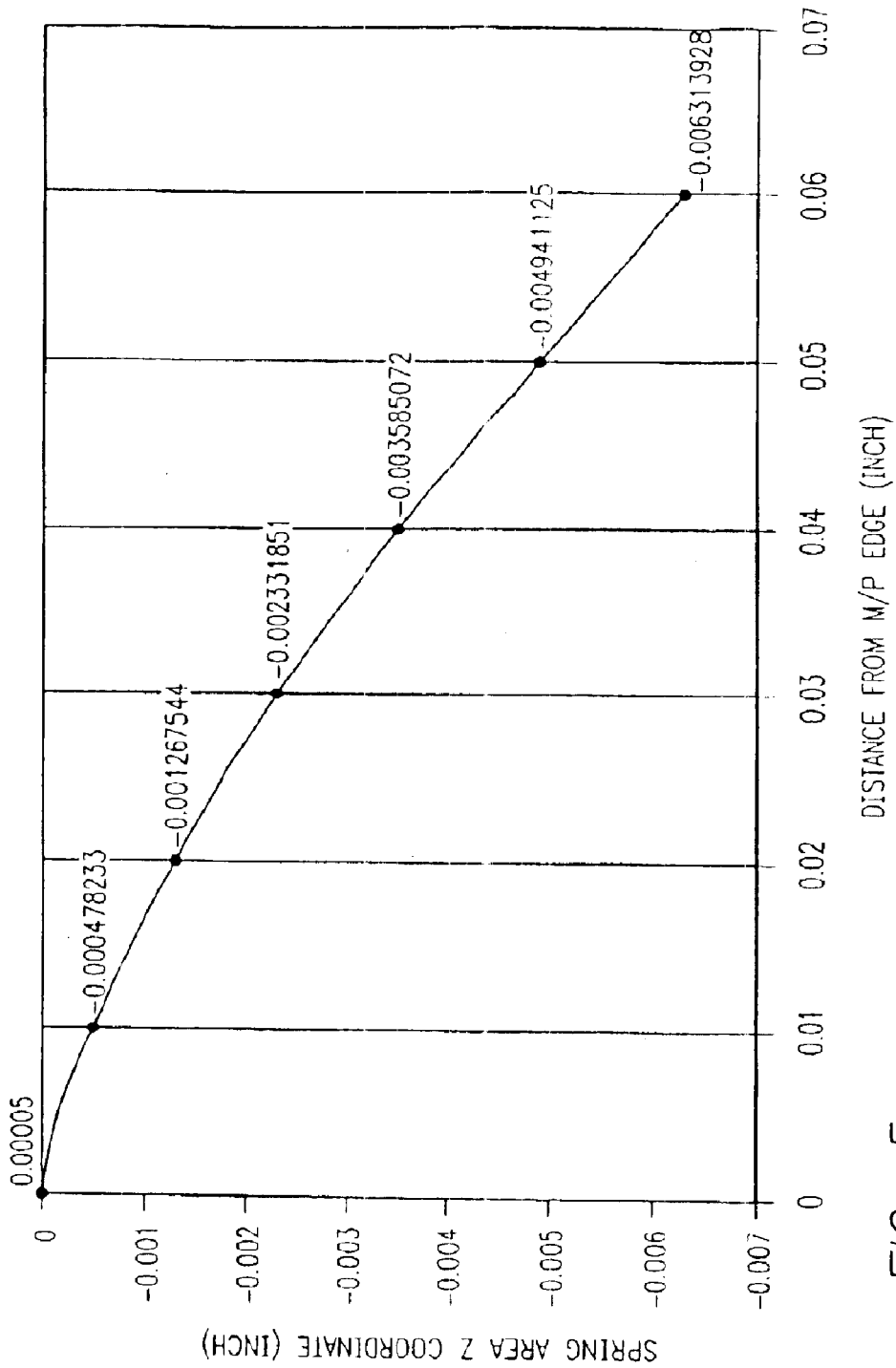
FIG. 5 is a graphical plot of the Z coordinate of the suspension load beam spring portion.

Thus, assuming the particular spring profile, shown in FIG. 5, in the free state position for initial gain control, the $2^{nd}$ bend of the invention is another adjustment for gain control. FIGS. 2, 3 and 4 indicate that the gain will be minimized if the bend 1-16, 2-16 and 3-16 location is close to slider 1-18, 2-18 and 3-18. In general, the $2^{nd}$ bend amount should be such in size that it will counteract or compensate for the offset produced by the protrusion height of dimple 1-22, 2-22 and 3-22 protrusion, which is 0.002~0.004".

By figuratively connecting the center point of the bottom of dimple 1-22, 2-22 and 3-22 with the suspension pivot location 1-24, 2-24 and 3-24, corresponding to the edge of the mount plate 1-26, 2-26 and 3-26), the rotation centerline of suspension during flying is defined. In FIGS. 2, 3, and 4, then the bias between the suspension side profile and the suspension rotation center line is shown. Less bias means less amplitude in $2^{nd}$ torsion. Table 1 lists the detailed bias for FIGS, 2, 3 and 4.

TABLE 1

The gain distribution after forming.

| | T1 gain (dB) | T2 gain (dB) | T2 rotation center z coordinate | Bias from T2 rotation axis |
|---|---|---|---|---|
| Original | >10 | >20 | 0.00314" | >0.003" |
| 0.274" from boss center bend 0.00264" downward | 4 | 11.2 | 0.00314" | 0.0025" |
| 0.317" from boss center bend 0.00264" downward | 4.3 | 7.5 | 0.00314" | 0.002" |
| 0.38" from boss center bend 0.00264" downward | 1.92 | 4.5 | 0.00314" | 0.00126" |

Note that by introducing a second bend at the slider just 0.274" from the boss center decreased $2^{nd}$ torsion gain from over 20 dB to 11.2. Making the bend closer to the slider 0.317" from the boss center further decreased 2nd torsion to 7.5 dB, and a further shift of the bend to ward the slider to be 0.38° from the boss center further reduced the $2^{nd}$ torsion to only 4.5 dB. $1^{st}$ torsion was similarly improved.

In summary, torsion gain is minimized by following the following principles:

1. The $1^{st}$ bend profile should follow the digitized location in FIG. 5 (different suspension should have different optimized spring profile). The purpose is to let the spring become straight after loading. In this case, the spring profile will follow the rotation center line, and that is good both for $1^{st}$ and $2^{nd}$ torsion gain control. From Finite Element Analysis (FEA), find the node position of $1^{st}$ torsion, the $1^{st}$ torsion node position should follow the rotation centerline of suspension.

2. The $2^{nd}$ bend location should be close to slider location, and bend amount should compensate dimple protrusion. By doing this, it is much easier to control the load beam profile, compared to bending in the middle of load beam. The purpose is to let the load beam profile follow the rotation centerline of suspension. The key is to let majority of load beam length to follow the suspension rotation centerline.

3. From FEA modeling, find the $2^{nd}$ torsion node position, the bias between $2^{nd}$ torsion node point and load beam profile should close to zero.

4. The load beam should be rigid enough, that is, during loading; the load beam profile shouldn't change too much. The load beam should have rigid rail or the load beam thickness should be equal or thicker than 0.004".

The invention thus provides a suspension having a minimized $2^{nd}$ torsion characteristic while the dimple height is retained, by adjusting the suspension load beam locally to overcome the deflection and bias that the dimple height introduces into the beam portion while retaining the major portion of the beam portion straight. Specifically, the invention reshapes the distal section of the beam portion immediately adjacent the slider to accommodate the dimple height without losing straightness in the major length of the beam portion, and to maintain nearly coincident the beam portion side profile and the centerline axis of rotation, thus to minimize the $2^{nd}$ torsion characteristic.

The foregoing objects are thus met.

We claim:

1. A disk drive suspension having a minimized $2^{nd}$ torsion characteristic, said suspension comprising a load beam having a given side profile and centerline rotation axis and comprising a base portion, a spring portion, and a beam portion, said beam portion having a distal section supporting a flexure having a tongue, a dimple between said tongue and said load beam, and a slider carried on said tongue for gimballing movement about said dimple, said dimple having a given height that displaces said beam portion so that the beam portion side profile is biased from said centerline rotation axis, said beam portion distal section having a bend of a size and location to offset the displacement of said beam portion by said dimple while maintaining said beam portion straight before said distal section, whereby said beam portion side profile registers with its said centerline rotation axis and its $2^{nd}$ torsion characteristic is minimized.

2. A method for minimizing $2^{nd}$ torsion characteristic in a disk drive suspension, said suspension comprising a load beam having a given side profile and centerline rotation axis and comprising a base portion, a spring portion, and a beam portion, including providing said beam portion with a distal section, supporting a flexure having a tongue on said distal section, providing a dimple between said tongue and said load beam, providing a slider carried on said tongue for gimballing movement about said dimple, giving said dimple a height that displaces said beam portion so that the beam portion side profile is biased from said centerline rotation axis, and providing in said beam portion distal section a bend of a size and location to offset the displacement of said beam portion by said dimple while maintaining said beam portion straight before said distal section to register said beam portion side profile with its said centerline rotation axis and thereby minimize its $2^{nd}$ torsion characteristic.

* * * * *